US009787219B2

(12) United States Patent
Wu et al.

(10) Patent No.: US 9,787,219 B2
(45) Date of Patent: Oct. 10, 2017

(54) MODULATION POLICY FOR MODULAR MULTI-LEVEL CONVERTER

(71) Applicant: CHINA UNIVERSITY OF MINING AND TECHNOLOGY, Jiangsu (CN)

(72) Inventors: Xiaojie Wu, Jiangsu (CN); Zheng Gong, Jiangsu (CN); Peng Dai, Jiangsu (CN); Gaige Liang, Jiangsu (CN); Yiwen Geng, Jiangsu (CN); Quanjun Guo, Jiangsu (CN); Juan Zhou, Jiangsu (CN); En Fang, Jiangsu (CN); Xia Zhao, Jiangsu (CN); Huaxia Dai, Jiangsu (CN); Xiao Zong, Jiangsu (CN); Guangsheng Liu, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 470 days.

(21) Appl. No.: 14/409,231

(22) PCT Filed: Feb. 19, 2014

(86) PCT No.: PCT/CN2014/072229
§ 371 (c)(1),
(2) Date: Dec. 18, 2014

(87) PCT Pub. No.: WO2014/135006
PCT Pub. Date: Sep. 12, 2014

(65) Prior Publication Data
US 2015/0171771 A1 Jun. 18, 2015

(30) Foreign Application Priority Data
Mar. 7, 2013 (CN) .......................... 2013 1 0072543

(51) Int. Cl.
H02M 7/5395 (2006.01)
H02M 7/483 (2007.01)
H02M 7/5387 (2007.01)

(52) U.S. Cl.
CPC ......... *H02M 7/5395* (2013.01); *H02M 7/483* (2013.01); *H02M 7/53871* (2013.01); *H02M 2007/4835* (2013.01); *Y10T 307/609* (2015.04)

(58) Field of Classification Search
CPC .............. H02M 7/5395; H02M 7/483; H02M 7/58371; H02M 2007/4835; Y10T 307/609
See application file for complete search history.

(56) References Cited

U.S. PATENT DOCUMENTS 5,638,263 A * 6/1997 Opal .................. H02M 3/285
363/65
5,933,339 A * 8/1999 Duba ................. H02M 7/49
363/41

(Continued)

FOREIGN PATENT DOCUMENTS

| CN | 101951162 A | 1/2011 |
|---|---|---|
| CN | 102195508 A | 9/2011 |

(Continued)

*Primary Examiner* — Jue Zhang
(74) *Attorney, Agent, or Firm* — Nath, Goldberg & Meyer; Jerald L. Meyer

(57) ABSTRACT

A modulation policy for a modular multi-level convertor, determining a switching state of each submodule by combining the current direction of each bridge arm and the capacitor voltage order of the submodules based on a carrier stacking method. The beneficial effects of the modulation policy are that: each phase only needs a modulation wave and N carriers, given N submodules of each upper bridge arm or lower bridge arm of the modular multi-level convertor; the modular multi-level convertor can output N+1 levels without carrier phase shift; N devoted submodules of each (Continued)

phase are guaranteed at any time; and the submodules' capacitor voltage balancing can be controlled without a closed-loop control policy. The modulation policy facilitates adjustment of the modular multi-level convertor voltage and power class, has unlimited number of levels, has a high precision control algorithm, is easy to realize in engineering and saves software and hardware resources.

1 Claim, 3 Drawing Sheets

(56) References Cited

U.S. PATENT DOCUMENTS

| | | | | |
|---|---|---|---|---|
| 6,005,788 | A * | 12/1999 | Lipo | H02M 7/49 363/71 |
| 7,428,158 | B2 * | 9/2008 | Bousfield, III | H02M 1/12 363/39 |
| 8,144,491 | B2 * | 3/2012 | Bendre | H02M 7/49 363/71 |
| 2012/0300514 | A1 | 11/2012 | Kolar et al. | |
| 2013/0286704 | A1 * | 10/2013 | Liu | H02M 1/12 363/132 |

FOREIGN PATENT DOCUMENTS

| | | |
|---|---|---|
| CN | 102843018 A | 12/2012 |
| CN | 103248252 A | 8/2013 |

* cited by examiner

1. Obtain 2N PWM pulses according to:

○ Compare modulation wave with carrier waves 1, 2, ..., N—N triangular carrier waves with the same amplitude, frequency and phase position stacked in the region within −1~1 vertical coordinate range.
   ○ For each carrier wave, if the value of the modulation wave is greater than the value of a triangular carrier wave, output '1'; else, output '0';.
   ○ Obtain N PWM pulses $PWM_1$, $PWM_2$, ..., $PWM_N$, from comparison result and negate $PWM_1$, $PWM_2$, ..., $PWM_N$ to obtain additional N PWM pulses $PWM_1'$, $PWM_2'$, ..., $PWM_N'$.

---

2. Measure current $i_{au}$ in the upper bridge arm and the current $i_{ad}$ in the lower bridge arm of each phase. At the beginning of each voltage balance control period, simultaneously measure the capacitive voltages $u_{cu1}$, $u_{cu2}$, ..., $u_{cuN}$ of the submodules in the upper bridge arm and the capacitive voltages $u_{cd1}$, $u_{cd2}$, ..., $u_{cdN}$ of the submodules in the lower bridge arm.

---

3. Sort $u_{cu1}$, $u_{cu2}$, ..., $u_{cuN}$ and $u_{cd1}$, $u_{cd2}$, ..., $u_{cdN}$ in ascending order respectively, and the sorting result is kept unchanged within one voltage balance control period. Input the sequence numbers of the submodules sorted by capacitive voltage in the upper bridge arm to an array $t_u[i]$, and the sequence numbers of the submodules sorted by capacitive voltage in the lower bridge arm to an array $t_d[i]$.

---

4. Allocate PWM pulses of the submodules in the upper bridge arm and lower bridge arm according to the capacitive voltage sorting result of the submodules and the current direction in bridge arm.

| For the upper bridge arm: | For the lower bridge arm: |
|---|---|
| if the current in the upper bridge arm is $i_{au}>0$, then the current charges the capacitor of the submodules in switched-in state, and the capacitive voltage rises, and the N PWM pulses $PWM_1$, $PWM_2$, ..., $PWM_N$ obtained in step (1) are allocated to the submodules $SM(t_u[1])$, $SM(t_u[2])$, ..., $SM(t_u[N])$ in sequence; | if the current in the lower bridge arm is $i_{du}>0$, then the current charges the capacitor of the submodules in switched-in state, and the capacitive voltage rises, and the N PWM pulses $PWM_1'$, $PWM_2'$, ..., $PWM_N'$ are allocated to the submodules $SM(t_d[N])$, $SM(t_d[N-1])$, ..., $SM(t_d[1])$ in sequence; |
| if the current in the upper bridge arm is $i_{au}<0$, then the capacitors of the submodules in switched-in state discharge, and the capacitive voltage drops, the N PWM pulses $PWM_1$, $PWM_2$, ..., $PWM_N$ obtained in step (1) are allocated to the submodules $SM(t_u[N])$, $SM(t_u[N-1])$, ..., $SM(t_u[1])$ in sequence. | if the current in the lower bridge arm is $i_{du}<0$, then the capacitors of the submodules in switched-in state discharge, and the capacitive voltage drops, the N PWM pulses $PWM_1'$, $PWM_2'$, ..., $PWM_N'$ obtained in step (1) are allocated to the submodules $SM(t_d[1])$, $SM(t_d[2])$, ..., $SM(t_d[N])$ in sequence. |

Fig. 4

MODULATION POLICY FOR MODULAR MULTI-LEVEL CONVERTER

FIELD OF THE INVENTION

The present invention relates to modulation techniques in the multi-level electric and electronic convertor field, in particular to a Carrier Based Pulse Width Modulation (CBPWM) policy for a modular multi-level convertor.

BACKGROUND OF THE INVENTION

In the high-voltage and high-power field, multi-level electric and electronic convertors are more and more widely used, owing to their unique advantages. A modular multi-level convertor is a new voltage source type convertor, which is designed with a strict modular structure, and thereby the production cost can be reduced in mass production; by submodules connected in series, the voltage class and power class of a convertor are easy to expand; owing to the multi-level output form of such a convertor, the harmonic content and total harmonic distortion of the output voltage are decreased, and thereby high-capacity AC filters can be reduced or even omitted; since the submodules in the bridge arms do not have to be switched on simultaneously, the variation rates of voltage and current in the bridge arms can be decreased, so that the stress borne on the switching elements is greatly decreased; moreover, the protective circuit of a modular multi-level convertor is simple and easy to implement.

The modulation policies for multi-level electric and electronic convertors mainly include Carrier Based Pulse Width Modulation (CBPWM) policies and Space Vector Based Pulse Width Modulation (SVPWM) policies, etc. SVPWM policies are rarely used in convertors that involve three or more levels, because they involve very complex calculation and it is difficult to select redundant vectors as the number of output levels increases. CBPWM policies are used widely. At present, most CBPWM policies for modular multi-level convertors utilize a carrier phase shift technique. When a carrier phase shift based pulse width modulation policy is used, the upper bridge arm and lower bridge arm of each phase require one modulation wave and N carrier waves that are phase-shifted in sequence, and the harmonic content of the output voltage can be greatly reduced without increasing the switching frequency. The convertor is easy to modular implement, and the workload on the switching elements is balanced and uniform. However, the workload in the control system will be increased when a carrier phase shift based pulse width modulation policy is used, owing to the fact that each carrier wave obtained by phase shift has to be generated separately and the carrier waves have to be synchronized. Especially, for a convertor that involves a large number of levels and a large quantity of submodules, a large quantity of carrier waves have to be generated when such a modulation policy is used. Thus, the requirement for software/hardware resources of the system is very stringent. Compared with carrier phase shift based pulse width modulation policies, to attain the same power output quality, the modulation policy for a modular multi-level convertor provided in the present invention does not require phase shift control of carrier waves, and each phase only requires one modulation wave and N carrier waves, which is to say, the required quantities of modulation waves and carrier waves are halved; in addition, with the modulation policy disclosed in the present invention, it is unnecessary to design a capacitive voltage balance closed-loop control algorithm for submodules; thus, the software/hardware resources of the system can be saved significantly, and engineering realization is easy. Hence, the modulation policy disclosed in the present invention is more suitable for use in modular multi-level convertors that involve a large number of levels.

SUMMARY OF THE INVENTION

To object of the present invention is to improve the existing carrier-based modulation policies for modular multi-level convertors with new topological structure, so as to lower the requirement for software/hardware resources of the system on the premise of ensuring the quality of power output of these convertors.

In the present invention, each phase of the modular multi-level convertor consists of an upper bridge arm, a lower bridge arm, and a reactor. In the modulation policy for a modular multi-level convertor disclosed in the present invention, PWM pulses are generated for the upper bridge arm and lower bridge arm according to a carrier stacked modulation method, and the PWM pulses are allocated to the submodules by sorting the capacitive voltages of the submodules in the bridge arms, and combining the current directions in the bridge arms, and then the working states of the submodules are determined Compared with the prior art, the modulation policy for a modular multi-level convertor provided in the present invention has the following advantages: each phase only needs a modulation wave and N carriers (N being the number of the submodules of each upper bridge arm or lower bridge arm of the modular multi-level convertor), the modular multi-level convertor is enabled to output N+1 levels without carrier phase shift, the precision of a control algorithm is high, it is easy for engineering realization, and saves software and hardware resources; the number of devoted submodules of each phase at any time can be guaranteed to be N, and the voltage balancing control of the capacitor voltage of the submodules can be achieved without a closed-loop control policy; meanwhile, the modulation policy facilitates the adjustment of the voltage and power class of the modular multi-level convertor, and is free from the limitation of the number of levels.

BRIEF DESCRIPTION OF THE DRAWINGS

FIG. 4 is a diagram of the steps of the modulation policy according to an embodiment of the application.

DETAILED DESCRIPTION OF THE EMBODIMENTS

A modulation policy for a modular multi-level convertor, wherein, the switching state of each submodule is determined by combining the current direction of each bridge arm and the capacitive voltage order of the submodule on the basis of a carrier stacking method.

Figure 1:
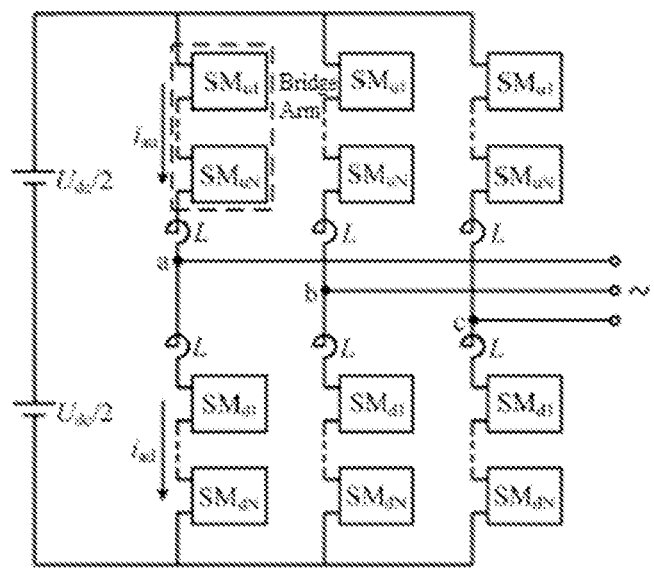
FIG. 1 is a topological diagram of main circuit of the modular multi-level convertor.
Figure 2:
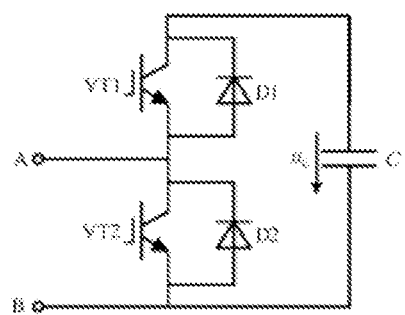
FIG. 2 is a topological diagram of the submodule circuits of the modular multi-level convertor.

Hereunder the present invention will be further detailed, with reference to the accompanying drawings:

FIG. 1 is a topological diagram of the main circuit of a modular multi-level convertor, wherein, each phase consists of an upper bridge arm, a lower bridge arm, and a reactor L connected in series; the upper bridge arm comprises N submodules ($SM_{u1}$-$SM_{uN}$), and the lower bridge arm comprises N submodules ($SM_{d1}$-$SM_{dN}$). All submodules have the same circuit structure, as shown in FIG. 2.

Each phase of the modular multi-level convertor consists of 2N submodules that have the same internal circuit. The circuit structure of the submodules is shown in FIG. 2. Wherein, VT1 and VT2 represent high-power controllable electric/electronic switches such as Insulated Gate Bipolar Transistors (IGBTs) and, Integrated Gate Commutated Thyristors (IGCTs), etc.; D1 and D2 represent anti-paralleled diodes of VT1 and VT2 respectively; C represents a DC capacitor, which has voltage of $u_c$, each submodule is a half-bridge structure, in which the power switches VT1 and VT2 are connected in series and then connected in parallel with the DC capacitor C; A and B are I/O terminals of submodule. As shown in FIG. 1, both the upper bridge arm and the lower bridge arm are formed by N submodules connected in series, i.e., the output terminal B of each submodule is connected to the input terminal A of the next submodule. The input terminal A of the topmost submodule $SM_{u1}$ in the upper bridge arm is connected to the positive electrode of DC power supply, and the output terminal B of the bottommost submodule $SM_{dN}$ in the lower bridge arm is connected to the negative electrode of DC power supply. Simultaneously, each submodule of the modular multi-level convertor contains a separate control unit.

For the purpose of clear description, hereunder two working states of the submodules in the modular multi-level convertor during normal operation will be described first. As shown in FIG. 2, when VT1 is on and VT2 is off, the current charges the capacitor via D1, or the capacitor discharges via VT1, and this state is referred to as a submodule switched-in state; when VT1 is off and VT2 is on, the current passes through VT2 or D2, the capacitor is always in bypassed state, and the voltage of the capacitor always has no change, this state is referred to as a submodule switched-out state.

Each submodule only requires one channel of trigger pulse, since the on/off states of submodules VT1 and VT2 are complementary. After the submodule control unit negates the trigger pulse and obtains a complementary trigger pulse and sets a dead zone, the resultant trigger pulse is used as the trigger signal of the submodules VT1 and VT2.

Hereunder the influence of the current direction in the bridge arm on the capacitive voltage of the submodules will be described exemplarily by using the phase 'a' of the modular multi-level convertor as an example. As shown in FIG. 1, both the positive direction of the electric current $i_{au}$ in the upper bridge arm and the positive direction of the electric current $i_{ad}$ in the lower bridge arm are in downward direction. When the values of $i_{au}$ and $i_{ad}$ are greater than 0, they are charging currents, the capacitor of the submodule in switched-in state will be charged, and the voltage of the capacitor will rise; when the values of $i_{au}$ and $i_{ad}$ are smaller than 0, they are discharging currents, the capacitor of the submodule in switched-in state will discharge, and the voltage of the capacitor will drop.

Figure 3:
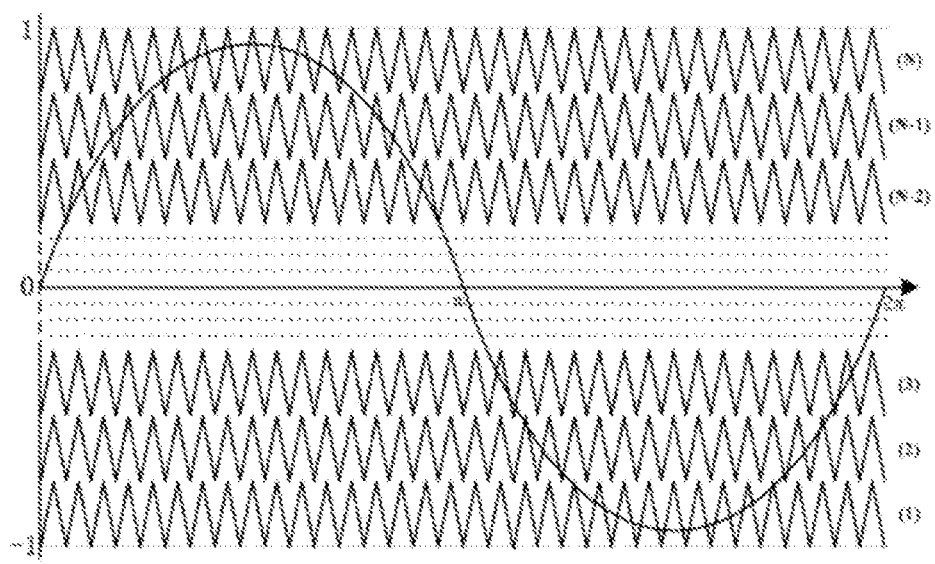
FIG. 3 is a schematic diagram of carrier stacked modulation.

The modulation policy disclosed in the present invention can be implemented through the following four steps:

(1) As shown in FIG. 3, N triangular carrier waves with the same amplitude $A_c=2/N$, the same frequency $f_c$, and the same phase position are used, and stacked in the region within −1~1 vertical coordinate range, i.e., carrier wave 1, 2, . . . , N, when counted from bottom to top. After comparing the modulation wave with the N carrier waves, if the value of the modulation wave is greater than the value of a triangular carrier wave, '1' is outputted as the comparison result; on the contrary, if the value of the modulation wave is smaller than the value of a triangular carrier wave, '0' is outputted as the comparison result. Through comparison, N PWM pulses are obtained, i.e., $PWM_1$, $PWM_2$, . . . , $PWM_N$, which are in one-to-one correspondence to the triangular carrier waves. The N PWM pulses are negated, to obtain N PWM pulses $PWM_1'$, $PWM_2'$, . . . , $PWM_N'$.

(2) The current $i_{au}$ in the upper bridge arm and the current $i_{ad}$ in the lower bridge arm of each phase is measured, and the capacitive voltages $u_{cu1}$, $u_{cu2}$, . . . , $u_{cuN}$ of the submodules in the upper bridge arm and the capacitive voltages $u_{cd1}$, $u_{cd2}$, . . . , $u_{cdN}$ of the submodules in the lower bridge arm are measured at the same time, at the beginning of each voltage balance control period.

(3) The capacitive voltages of the submodules in the upper bridge arm and the lower bridge arm measured in step (2) are sorted in ascending order respectively, and the sorting result is kept unchanged within one voltage balance control period. The sequence numbers of the submodules sorted by capacitive voltage in the upper bridge arm are put into an array $t_u[i]$, and the sequence numbers of the submodules sorted by capacitive voltage in the lower bridge arm are put into an array $t_d[i]$.

(4) PWM pulses of the submodules in the upper bridge arm and lower bridge arm are allocated according to the capacitive voltage sorting result of the submodules and the current direction in bridge arm.

For the upper bridge arm, if the current in the upper bridge arm is $i_{au}>0$, then the current charges the capacitor of the submodules in switched-in state, and the capacitive voltage rises, and the N PWM pulses $PWM_1$, $PWM_2$, . . . , $PWM_N$ obtained in step (1) are allocated to the submodules $SM(t_u[1])$, $SM(t_u[2])$, . . . , $SM(t_u[N])$ in sequence; if the current in the upper bridge arm is $i_{au}<0$, then the capacitors of the submodules in switched-in state discharge, and the capacitive voltage drops, the N PWM pulses $PWM_1$, $PWM_2$, . . . , $PWM_N$ obtained in step (1) are allocated to the submodules $SM(t_u[N])$, $SM(t_u[N-1])$, . . . , $SM(t_u[1])$ in sequence.

For the lower bridge arm, if the current in the lower bridge arm is $i_{du}>0$, then the current charges the capacitor of the submodules in switched-in state, and the capacitive voltage rises, and the N PWM pulses $PWM_1'$, $PWM_2'$, . . . , $PWM_N'$ obtained in step (1) are allocated to the submodules $SM(t_d[N])$, $SM(t_d[N-1])$, . . . , $SM(t_d[1])$ in sequence; if the current in the lower bridge arm is $i_{du}<0$, then the capacitors of the submodules in switched-in state discharge, and the capacitive voltage drops, the N PWM pulses $PWM_1'$, $PWM_2'$, . . . , $PWM_N'$ obtained in step (1) are allocated to the submodules $SM(t_d[1])$, $SM(t_d[2])$, . . . , $SM(t_d[N])$ in sequence.

The invention claimed is:

1. A modulation policy for a modular multi-level convertor, wherein, the switching state of each submodule is determined by combining the current direction in each bridge arm and the capacitive voltage order of the submodule on the basis of a carrier stacking method, comprising:

(1) employing N triangular carrier waves with the same amplitude value, frequency, and phase position, and stacking them into a region within −1~1 vertical coordinate range, i.e., carrier waves 1, 2, . . . , N when counted from bottom to top; after comparing a modulation wave with the N carrier waves, outputting '1' as the comparison result if the value of the modulation wave is greater than the value of a triangular carrier wave, on the contrary, output '0' as the comparison result if the value of the modulation wave is smaller than the value of a triangular carrier wave; through comparison, obtaining N PWM pulses, i.e., $PWM_1$, $PWM_2$, $PWM_N$, which are in one-to-one correspondence to the triangular carrier waves; negating the N PWM pulses, to obtain N PWM pulses $PWM_1'$, $PWM_2'$, $PWM_N'$;

(2) measuring the current $i_{au}$ in the upper bridge arm and the current $i_{ad}$ in the lower bridge arm of each phase, and measuring the capacitive voltages $u_{cu1}$, $u_{cu2}$, ..., $u_{cuN}$ of the submodules in the upper bridge arm and the capacitive voltages $u_{cd1}$, $u_{cd2}$, ..., $u_{cdN}$ of the submodules in the lower bridge arm at the same time, at a beginning of a voltage balance control period;

(3) sorting the capacitive voltages of the submodules in the upper bridge arm and the lower bridge arm measured in step (2) in ascending order respectively, and keeping the sorting result unchanged within a voltage balance control period; putting the sequence numbers of the submodules sorted by capacitive voltage in the upper bridge arm into an array $t_u[i]$, and putting the sequence numbers of the submodules sorted by capacitive voltage in the lower bridge arm into an array $t_d[i]$;

(4) allocating PWM pulses of the submodules in the upper bridge arm and lower bridge arm according to the capacitive voltage sorting result of the submodules and the current direction in bridge arm;

for the upper bridge arm, allocating the N PWM pulses $PWM_1$, $PWM_2$, ..., $PWM_N$ obtained in step (1) to the submodules $SM(_{tu[1]})$, $SM(_{tu[2]})$, ..., $SM(_{tu[N]})$ in sequence, if the current in the upper bridge arm is $i_{au}>0$; otherwise allocating the N PWM pulses $PWM_1$, $PWM_2$, ..., $PWM_N$ obtained in step (1) to the submodules $SM(t_u[N])$, $SM(t_u[N-1])$, ..., $SM(t_u[1])$ in sequence if the current in the upper bridge arm is $i_{au}<0$;

for the lower bridge arm, allocating the N PWM pulses $PWM_1'$, $PWM_2'$, ..., $PWM_N'$ obtained in step (1) to the submodules $SM(_{td[N]})$, $SM(_{td[N-1]})$, ..., $SM(_{td[1]})$ in sequence, if the current in the lower bridge arm is $i_{du}>0$; otherwise allocating the N PWM pulses $PWM_1'$, $PWM_2'$, ..., $PWM_N'$ obtained in step (1) to the submodules $SM(t_d[1])$, $SM(t_d[2])$, ..., $SM(t_d[N])$ in sequence if the current in the lower bridge arm is $i_{du}<0$.

* * * * *